United States Patent
Shell et al.

(10) Patent No.: US 7,529,197 B2
(45) Date of Patent: *May 5, 2009

(54) SYSTEM AND METHOD FOR CONTINUOUSLY PROVISIONING A MOBILE DEVICE

(75) Inventors: Scott R. Shell, Redmond, WA (US); Lee M. Butler, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/405,174

(22) Filed: Apr. 17, 2006

(65) Prior Publication Data

US 2006/0193321 A1  Aug. 31, 2006

Related U.S. Application Data

(63) Continuation of application No. 11/115,522, filed on Apr. 26, 2005, which is a continuation of application No. 09/895,471, filed on Jun. 29, 2001.

(51) Int. Cl.
*H04J 12/28* (2006.01)

(52) U.S. Cl. .................. 370/254; 370/349; 370/389; 370/465; 709/221

(58) Field of Classification Search .............. 370/241, 370/252, 254, 310, 465, 537; 709/220, 221, 709/222; 455/418, 419, 420
See application file for complete search history.

(56) References Cited

U.S. PATENT DOCUMENTS

| | | | |
|---|---|---|---|
| 5,818,871 A * | 10/1998 | Blakeney et al. ............ 375/220 |
| 6,173,420 B1 * | 1/2001 | Sunkara et al. ................ 714/38 |
| 6,349,306 B1 * | 2/2002 | Malik et al. ............. 707/103 R |
| 6,370,141 B1 * | 4/2002 | Giordano et al. ............ 370/386 |
| 6,487,218 B1 * | 11/2002 | Ludwig et al. ............... 370/469 |
| 6,772,158 B1 | 8/2004 | Giammaria ................... 707/10 |
| 6,775,559 B1 * | 8/2004 | Weghorst et al. ............ 455/558 |
| 6,922,723 B1 * | 7/2005 | Sharp et al. .................. 709/221 |
| 6,976,063 B1 * | 12/2005 | Dharmarajan et al. ....... 709/220 |
| 7,245,636 B1 * | 7/2007 | Hans et al. ................... 370/474 |
| 7,293,077 B1 * | 11/2007 | Teo et al. ..................... 709/221 |
| 7,319,872 B2 * | 1/2008 | Krishnamurthi et al. ..... 455/442 |
| 2004/0127198 A1 * | 7/2004 | Roskind et al. .......... 455/412.2 |
| 2004/0203580 A1 * | 10/2004 | Engelhart .................... 455/406 |
| 2006/0106806 A1 * | 5/2006 | Sperling et al. ............... 707/10 |

* cited by examiner

*Primary Examiner*—Chi H. Pham
*Assistant Examiner*—Shick Hom
(74) *Attorney, Agent, or Firm*—Merchant & Gould; Ryan T. Grace

(57) ABSTRACT

Described is a provisioning system for receiving configuration changes to and queries of settings on a mobile device. One implementation includes a router component and a configuration manager component. The router component is responsible for receiving messages delivered to the mobile device and parsing the messages into requests for information. The router component is also responsible for authenticating and decrypting the messages. Once properly authenticated and decrypted, the router component passes the message to the configuration manager component. The configuration manager component is responsible for determining what configuration settings are affected by the message and for processing the requests within the message. The configuration manager component may additionally compose a response document to return in the event that a response has been requested in the message.

20 Claims, 8 Drawing Sheets

Push Router Client Application Registration table

| Client Application Handles | Content-Type supported by the Client Application | AppID of Client Application |
|---|---|---|
| ClientAppA_Handle | Text/Foo | |
| ClientAppB_Handle | Text/Foo | ClientAppB |
| ClientAppC_Handle | Text/Foo | ClientAppC |
| ClientAppC_Handle | | ClientAppC |

602    604    606

600

SYSTEM AND METHOD FOR CONTINUOUSLY PROVISIONING A MOBILE DEVICE

REFERENCE TO RELATED APPLICATION

This application is a continuation of application Ser. No. 11/115,522 filed on Apr. 26, 2005, which is a continuation of application Ser. No. 09/895,471, filed on Jun. 29, 2001. The benefit of the earlier filing date is hereby claimed under 35 U.S.C. § 120.

BACKGROUND OF THE INVENTION

The use of mobile electronics is growing by leaps and bounds. Mobile devices, such as cellular phones and personal digital assistants (PDAs), are transforming from relatively-simple single-function devices into complex devices with both telephone and PDA capabilities. With these improvements comes a greater need for configurability and maintenance. With each type of application or functionality installed on a mobile device comes additional configuration settings. In the past, configuration settings for the mobile device were set one time, such as during a "bootstrap provisioning" transaction, and either not changed or changed by manually activating a keypad or other input system on the mobile device, which of course requires physical access to the mobile device.

As these devices become more and more complex, there is a greater chance that configuration settings stored on the mobile device will need to be changed. For instance, a service provider may have a need to change the phone number to which the mobile device responds, or to modify a setting related to an e-mail application on the device. However, until now, modifying settings on a mobile device (or "provisioning") has been a burdensome and difficult task. A typical maintenance scenario might be that a mobile device user calls a tech support contact (maybe the mobile operator or maybe a corporate helpdesk) and complains about a problem. The current remedy is for the support technician to walk the user through a long complicated series of steps to determine the current configuration of the mobile device, and then walks the user through a number of steps to fix the configuration. This is obviously a very tedious process, labor intensive, and prone to human error.

Additionally, in an effort to control the total cost of ownership (TCO) of running complicated devices, the mobile device may be configured so that the end user does not have permission to view or modify the settings which are involved in their problem. In order to control TCO and prevent the user from corrupting the settings, end user access to the settings can be controlled. In that case, the support technician requires this functionality and access to the mobile device in order to correctly diagnose the problem. Until now, a solution to these problems has eluded those skilled in the art.

SUMMARY OF THE INVENTION

Briefly described, the present invention provides a provisioning system for receiving configuration changes to and queries of settings on a mobile device. In one aspect, the invention includes a router component and a configuration manager. The router component is responsible for receiving messages delivered to the mobile device and parsing the messages into requests for information. The messages may be delivered in document format, such as in the extensible Markup Language (XML) format. The requests may take the form of a request to respond with existing configuration settings, or to set certain configuration settings on the mobile device. The router component is also responsible for authenticating and decrypting the messages. Once properly authenticated and decrypted, the router component passes the message to the configuration manager. The configuration manager is responsible for determining what configuration settings are affected by the message and for processing the requests within the message. For example, the configuration manager may process a request to query a configuration setting by retrieving the requested information from a hardware register or a software registry. The configuration manager may implement one or more configuration service providers to perform the actual request processing. The configuration manager may additionally compose a response document to return in the event that a response has been requested in the message. In one implementation, the response may be created by modifying the original message received and returning that message to the router component.

In another aspect, the invention implements a communication methodology involving declarative statements within the message to enable one document to be used as both the input and output document. More particularly, declarative statements may be employed in the document that forms the input message. Those declarative statements may be interpreted by one or more components of the mobile device to either make variables within the document equal to an existing setting (in the query case) or to set a setting equal to a value provided in the document. In this way, the single document may be viewed as a constant representative of the state of the configuration settings.

In yet another aspect, the invention includes transactioning mechanisms that enable a failed configuration transaction to be rolled back to a known-good state. More specifically, the configuration manager (or an instantiated configuration service provider) includes transactioning mechanisms to safely store away a known-good state of the configuration settings for which it is responsible. Once it is determined that the changes may be implemented without putting the system into an unsafe or unstable state, the changes may be committed. In the event of a failure to make the configuration changes safely, the system may be rolled back to the known-good state.

In still another aspect, the invention enables response processing. More particularly, the mechanisms of the invention make it possible for a substantive response to be returned with detailed information about the provisioning transaction. Through the use of the communication methodology described above, a single document may include statements that, although declarative, are interpreted as instructions to perform operations, such as to query or alter settings. In this way, the document contains the state of the settings on the mobile device as they should appear at the conclusion of a successful transaction. In this way, the document may be returned to the provisioning system as an indicator that the transaction completed successfully. The document may also be modified to reflect the existing state of any identified settings, such as by declaring a variable to have a value equal to the existing value of the identified settings. Other mechanisms will also become apparent for processing substantive response requests based on the teachings of the present invention.

DETAILED DESCRIPTION OF THE PREFERRED EMBODIMENT

An illustrative system and method for continuously provisioning or configuring a mobile device are described in the following. Alternative constructions may be provided throughout but are not to be viewed as limiting, and other alternative constructions will become apparent to those skilled in the art upon reading this document. The illustrative system and its environment are described first, followed by a description of certain methods employed by the illustrative system for performing the duties of provisioning a mobile device. The terms "provisioning" and "configuring" or "configuration" may sometimes be used interchangeably throughout this document. There is no intended distinction between those terms.

Illustrative Wireless Environment

Figure 1:
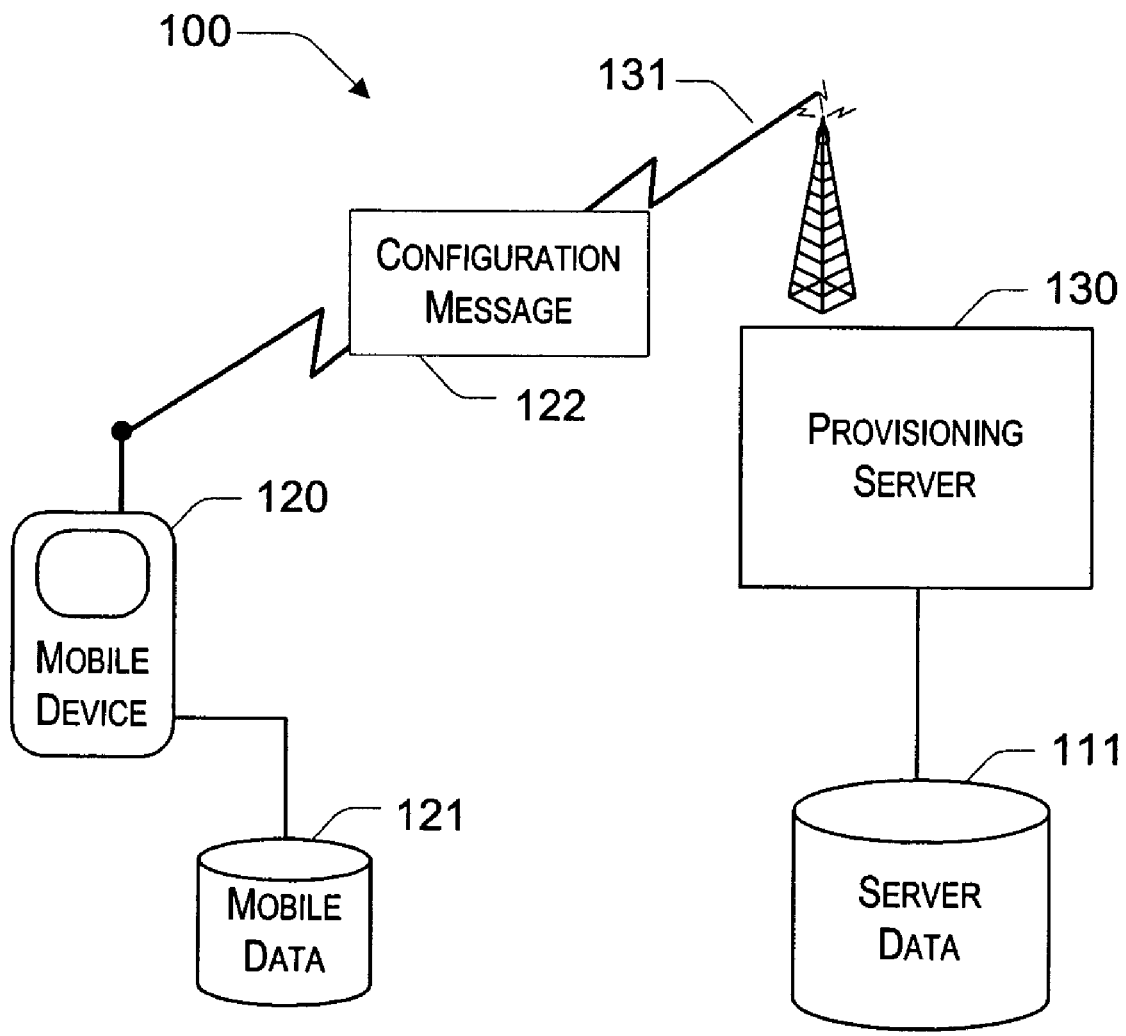
FIG. 1 is a functional block diagram of a wireless environment in which the present invention may be implemented.

FIG. 1 is a functional block diagram of a wireless environment 100 in which the present invention may be implemented. Principally, the wireless environment 100 includes a mobile device 120 in communication with a provisioning server 130 over a wireless link 131. The provisioning server 130 may be the principal point of connectivity for the mobile device 120, such as a public wireless service provider (e.g., a cellular carrier) or a private wireless communications network (e.g., a corporate communications network). Alternatively, the provisioning server 130 may be a dedicated provisioning server acting in cooperation with the principal point of connectivity. The provisioning server 130 includes a data store (server data 111) that contains information about the mobile device 120, such as the type and model of mobile device, any installed applications and their versions, service plan information, current configuration settings, and the like.

Although only one provisioning server 130 is illustrated in FIG. 1, there may be multiple servers in the system 100 that each perform provisioning functions on the mobile device 120. For example, one server (e.g., the provisioning server 130) may be responsible for maintaining device-specific information about the mobile device 130, such as the device's identification or phone number. There may be another server, such as a software vendor's maintenance server, responsible for the maintenance and upgrading of installed software on the mobile device 120. Moreover, there may be yet another server, such as a corporate network server, responsible for maintaining configuration information used by a system for keeping the mobile device synchronized with the corporate network. In short, there may be many sources of provisioning information attempting to access the mobile device 120. It is this accessibility that gives rise to the security concerns described above.

The mobile device 120 is illustrated in detail in FIGS. 2 and 3 and described below. Briefly described, the mobile device 120 is a handheld computing device that includes the functionality of a mobile telephone as well as the functionality of a typical Personal Digital Assistant (PDA). The mobile device 120 may contain an operating system, several installed applications, communications software, and the like. The mobile device 120 also includes a data store (mobile data 121) that contains information used by the mobile device 120 in operation. Configuration settings for many of those components are stored in the mobile data 121.

The provisioning server 130 and the mobile device 120 communicate with each other over a wireless link 131, which may be any means for wireless communications, such as a radio frequency link or the like. The provisioning server 130 transmits configuration messages (e.g., configuration message 122) to the mobile device 120 over the wireless link 131. The configuration message is illustrated in detail in FIG. 5 and described below. Briefly described, the configuration message 122 is a markup language document, such as an eXtensible Markup Language (XML) document, that includes instructions for querying or altering configuration settings stored on the mobile device 120.

Although described here principally in the context of a configuration message 122 being delivered to a mobile device 120 over a wireless link 131, it will be appreciated that this is one likely implementation. Other implementations will also become apparent, such as delivering configuration messages to the mobile device 120 via a wired connection, such as a docking station or a synchronization cradle. In addition, nothing in the present invention excludes the ability to make configuration changes to the mobile device 120 using input mechanisms directly on the mobile device 120, such as a keypad or touch-sensitive display screen.

Mobile Computing Device Implementing the Present Invention

Figure 2:
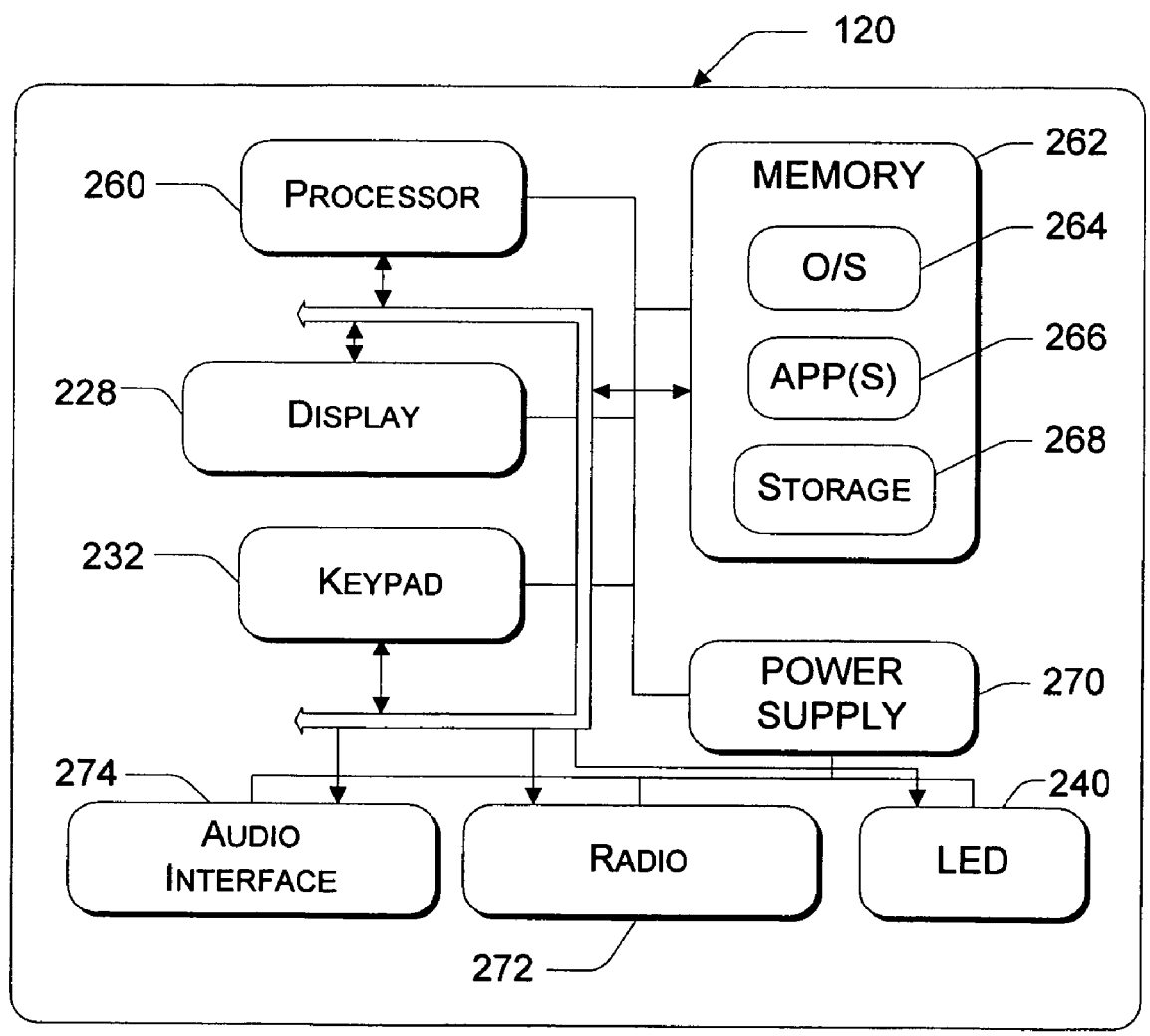
FIG. 2 is a functional block diagram of an illustrative mobile device which may be used to implement one embodiment of the present invention.

FIG. 2 is a functional block diagram illustrating components of a sample mobile device 120 adapted for use in one implementation of the present invention. The mobile device 120 has a processor 260, a memory 262, a display 228, and a keypad 232. The memory 262 generally includes both volatile memory (e.g., RAM) and non-volatile memory (e.g., ROM, Flash Memory, or the like). The mobile device 120 includes an operating system 264 which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile device 120 also includes non-volatile storage 268 within the memory 262. The non-volatile storage 268 may be used to store information which should not be lost if the mobile device 120 is powered down. The applications 266 may use and store information in the storage 268, such as e-mail or other messages used by an e-mail application, contact information used by a PIM, appointment information used by a scheduling program, documents used by a word processing application, and the like. A synchronization application may also reside on the mobile device and may be programmed to interact with a corresponding synchronization application resident on a host computer to keep the information stored in the storage 268 synchronized with corresponding information stored at the host computer.

The mobile device 120 has a power supply 270, which may be implemented as one or more batteries. The power supply 270 might further include an external power source, such as an AC adapter or a powered docking cradle, that supplements or recharges the batteries.

The mobile device 120 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile device 120 also includes a radio 272 that performs the function of transmitting and receiving radio frequency communications. The radio 272 facilitates wireless connectivity between the mobile device 120 and the outside world, via a communications carrier or service provider. Transmissions to and from the radio 272 are conducted under control of the operating system 264. In other words, communications received by the radio 272 may be disseminated to application programs 266 via the operating system 264, and vice versa.

The radio 272 allows the mobile device 120 to communicate with other computing devices, such as over a network. The radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
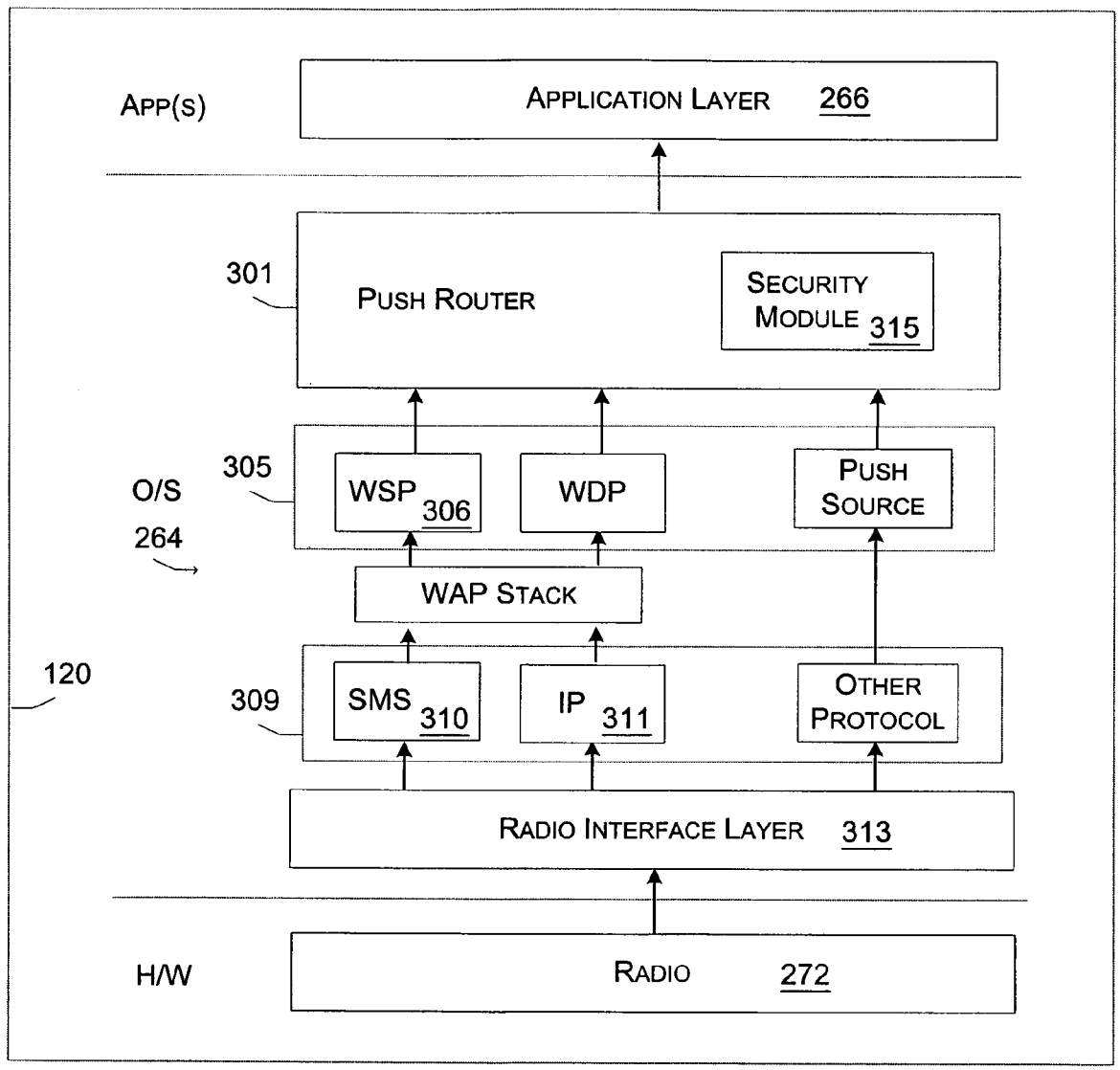
FIG. 3 is a functional block diagram of illustrative software components that implement one embodiment of the present invention.

FIG. 3 is a functional block diagram of illustrative software components on the mobile device 120 that implement the present invention. This implementation of the invention is described in the general context of computer-executable instructions or components, such as software modules, being executed on a mobile computing device. Generally, program modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

Illustrated in FIG. 3 are the radio 272, the applications 266, and, in greater detail, portions of the operating system 264. It will be appreciated that although several components are illustrated as portions of the operating system 264, it is possible to implement the functionality of those components outside of the operating system 264, such as within one or more of the applications 266. The several illustrated components of the operating system 264 include a push router 301, push sources 305, a transport layer 309, and a radio interface layer 313. Essentially, the radio 272 and the radio interface layer 313 act in concert to transmit and receive messages, including configuration messages. The radio interface layer 313 is a software component that interfaces with the radio hardware (radio 272) and exposes a common set of software functions to the other components of the operating system 264. In this way, developers may create software to take advantage of any type of radio hardware by interacting with the common interfaces presented by the radio interface layer 313, rather than directly with the radio 272. This functionality greatly simplifies the task of developing software for use with practically any radio hardware.

The transport layer 309 includes one or more transports that are configured to pass messages to and receive messages from the radio interface layer 313 in one or more communications protocols. For example, the SMS transport 310 is programmed to receive and transmit messages formatted using the Short Message Service (SMS), as defined by GSM Specifications, including GSM 03.40. Similarly, the IP transport 311 is programmed to receive and transmit messages formatted using the Internet Protocol (IP). Other transports may also be used, as will be understood by those skilled in the art, and the transports shown are for illustrative purposes only. Configuration messages are transmitted to the mobile device 120 over one or more of the transports in the transport layer 309.

The push sources 305 are software components configured to receive messages, such as configuration messages, from a configuration message initiator (e.g., the provisioning server 130), via a corresponding transport, and make the message available to the push router 301. In this implementation of the invention, configuration messages are delivered over any one or more of the transports, such as the SMS transport 310, and presented to the push router 301 using any one or more of the push sources, such as the WSP push source 306, a Subscriber Identity Module (SIM) file source, a local file push source, an HTTP push source, or the like. Typically, a push source is associated with a corresponding transport.

The push router 301 is a software component configured to receive incoming messages from each of the push sources 305 and to route the incoming messages to the proper application registered to receive them. For example, a configuration management application in the application layer 266 may be registered to receive certain messages delivered over the SMS transport 310. Thus, as those messages are received over the SMS transport 310, the WSP push source 306 makes them available to the push router 301, which in turn passes them to the registered configuration management application. Incoming messages that carry provisioning information are received by the push router 301. The push router 301 includes procedures to decompose and parse the received messages into constituent parts to identify a target application, and to pass the payload (i.e., the portion of the message related to configuration) to the target application. Moreover, the push router 301 is configured to transmit messages over the transports in response to application requests.

Figure 6:
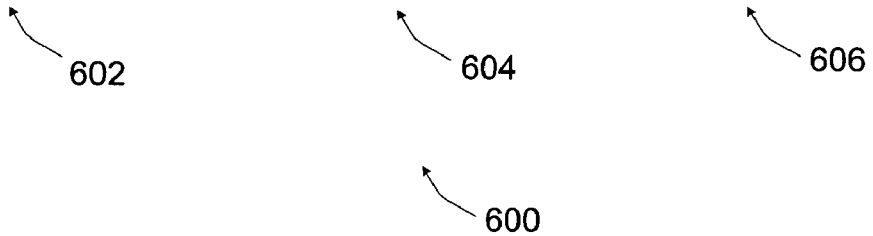
FIG. 6 is a graphical representation of information stored in a Registration table that describes applications that may make use of a configuration system implementing the present invention.

The push router 301 is also configured to determine if a response has been requested to any incoming configuration messages and to pass that information along to the target application. The push router 301 may also include the type of response requested and a response destination address. The push router 301 may make use of an Open Handle table to maintain handles to and content type supported by running applications 266 that can handle configuration requests. The push router 301 may also maintain a Registration table (illustrated in FIG. 6) to list the client applications 266 that are registered as capable of retrieving and processing push payloads. Turning briefly to FIG. 6, the Registration table 600 includes a listing of client application handles 602 to the registered applications, a listing of the content type supported by the application 604, and an appID 606 associated with the application. The Registration table 600 is used to identify the content type that is supported by any registered applications. The Registration table 600 may also be used to load an application 266 if it is not already running at the time an incoming push payload (such as within a configuration message) is available to be routed to the particular application.

An application registers with the push router 301 by placing an entry in the Registration table 600 using a content type, an appID, or a combination of both. The push router 301 may place a higher priority for message routing for applications which register both a content type and an appID. For example, if a configuration manager application (shown in FIG. 4) is intended to handle configuration messages, it would register with the push router 301 by inserting the appropriate entry in the Registration table 600.

Returning to FIG. 3, the push router 301 may include a security module 315 responsible for performing certain security validation functions on incoming messages. For example, the security module 315 may authenticate and decrypt incoming messages to identify the source of the message. The security module 315 may also be configured to assign a security role to each incoming message based on the source of the message and possibly an encryption key used to decrypt the message content.

The push router 301 interacts with other components within the mobile device 120 through a system of programming interfaces and parameters. What follows is an illustrative description of several programming interfaces and data structures that may be recognized by the push router 301 in one actual embodiment for carrying out the functions described above. An explanation of any interfaces or parameters is provided for any of the interfaces or parameters for which its name does not make its function self-evident.

Push Router Core Client Interface

There are six functions in the Push Router Client Interface. These functions discover and establish and maintain the communication channel with the client for which the Push Router has received a provisioning payload.

PushRouter_RegisterClient

This function registers a client in the Push Router's Registration Table. All clients that will require any interaction with Push Router have to register using this function.
    Parmeters:
        szAppId; Provides the Application Id of the registered client
        szPath; Provides the path to the exe of the registered client
        szParams; Provides client parameters.

PushRouter_UnRegisterClient

This function deletes a client entry from the Registration table in Push Router
    Parameters
        szAppId; A handle to the device to be deleted.

PushRouter_Open

This function opens a communication channel to a client through which the push message will be passed. It also creates an entry for the running client in the open handle table.
    Parameters
        szAppId,
        *pMsgAvailableEvent; Flags the client that there is a message available.
        *phPushRouter; A returned Push Router handle which the client application must pass into other push router functions PushRouter_Close This function closes the communication with the client.
    Parameters
        hPushRouter; A push router handle which was returned from a call to PushRouter_Open PushRouter_GetMessage This function passes the payload to the client
    Parameters
        *pPushMsg
        hPushRouter; A push router handle which was returned from a call to PushRouter_Open PushRouter_SendResponse This function receives the response from the client and sends it out.
    Parameters
        hPushRouter; A push router handle which was returned from a call to PushRouter_Open
        *pResponseMsg Push Router Client Interface—Structures There are two structures responsible for providing response requirement and delivery information between the Push Router and the Configuration Manager:
    PushMsg
    And
    ResponseMsg PushMsg This structure delivers information regarding the incoming payload from the Push Router to the Configuration Manager.

```
typedef struct tagPushMsg {
    DWORD    cbSize;
    LPTSTR   szHeaders;
    LPBYTE   pbBody;
    DWORD    dwBodyLength;
    DWORD    dwSecurityRole;
    BOOL     fResponseRequested;
    LPTSTR   szResponseAddress;
} PUSHMSG, *PPUSHMSG;
```

Parameters cbSize szHeaders; RFC 822 headers pbBody;

dwBodyLength;

dwSecurityRole; Assigns a Security Role to configuration request or Query which is used later to determine whether the query or set has the credentials to perform the task that it needs.

fResponseRequested; Provides requirement information for a response to a configuration request and query szResponseAddress; Provides the Response Address to a configuration request and query ResponseMsg The following structure delivers information regarding an outgoing response from the Configuration Manager to the Push Router:

```
typedef struct tagResponseMsg {
    LPTSTR              szDestinationAddress;
    LPTSTR              szHeaders;
    LPBYTE              pbBody;
    DWORD dwBodyLength;
    BOOL                fSignatureRequired;
} RESPONSEMSG, *PRESPONSEMSG;
```

Parameters cbSize szDesinationAddress; Provides the destination address for an outgoing response.

szHeaders;

pbBody;

dwBodyLength;

fSignatureRequired

Error handling Message not found when responding to MsgAvailable/GetMessage— a client application is requesting a message which does not exist. Push Router returns:

PUSHRTR_S_NOMESSAGESPENDING

Push Router Core Source Interface

Push Router Core Source interface includes one function:

PushRouter_SubmitPush and one structure—

SrcPushMsg

PushRouter_SubmitPush

This function passes the push message from the Push Source to Push Router core.

HRESULT PUSHROUTERAPI

PushRouter_SubmitPush(PSRCPUSHMSG pMsg);

Parameters:

PSRCPUSHMSG pMsg

SrcPushMsg

This structure passes information about the push message from the push source to Push Router Core

```
typedef struct tagSrcPushMsg {
    DWORD    cbSize;
    LPTSTR       szHeaders;           // RFC 822 headers
    LPBYTE       pbBody;
    DWORD        dwBodyLength;
    LPTSTR       szResponseAddress;   // URL or phone number
} SRCPUSHMSG,    *PSRCPUSHMSG;
```

Parameters:

cbSize;

szHeaders; RFC 822 headers pbBody;

dwBodyLength;

szResponseAddress; URL or phone number

The preceding interfaces, parameters, and structures are provided as illustrative only, and should not be viewed either as the only mechanism for passing information between the various components, or as necessarily the best mechanism as alternatives will become readily apparent to those skilled in the art.

Figure 4:
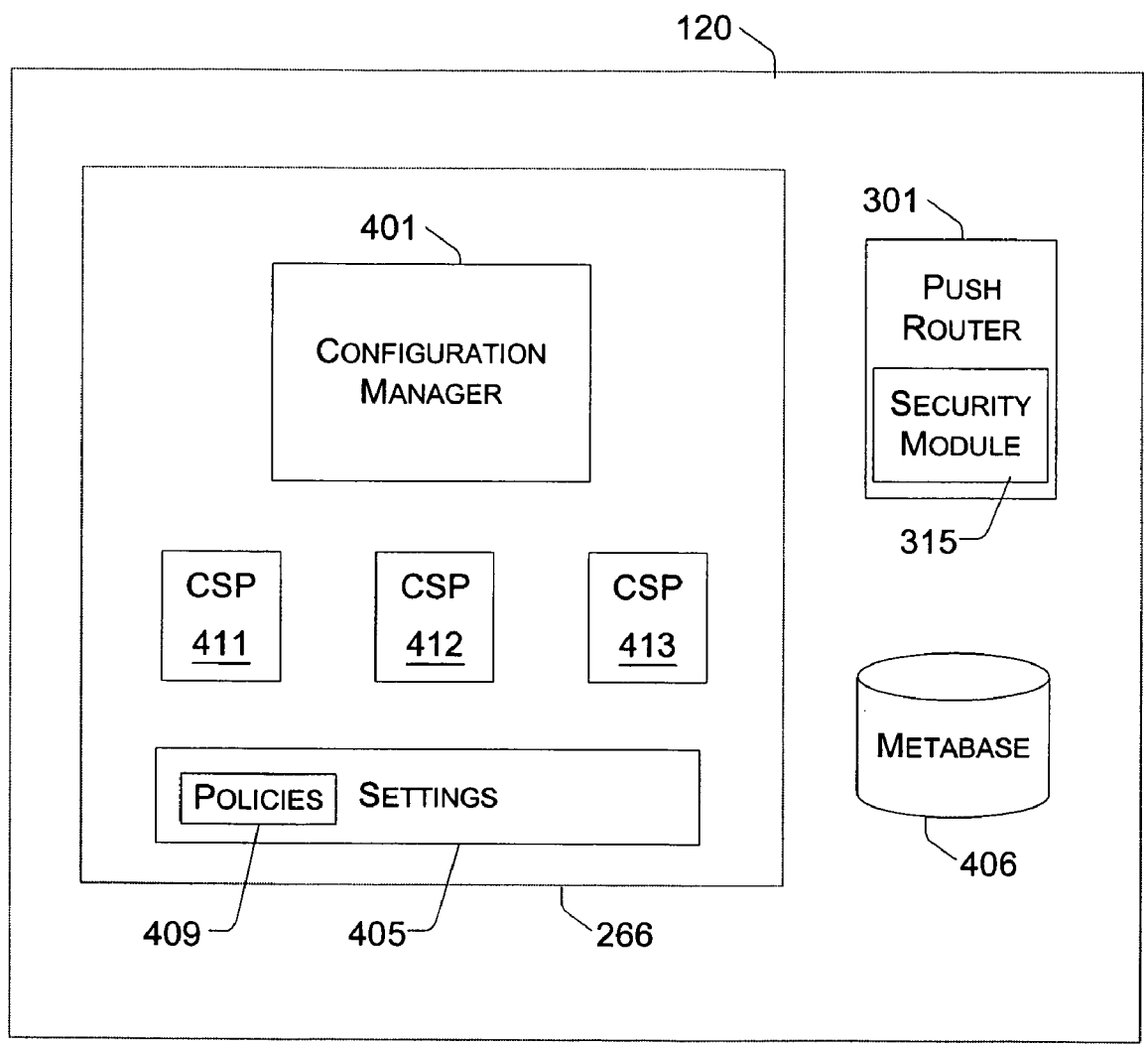
FIG. 4 is a functional block diagram illustrating in greater detail certain software components that operate within the application layer of the embodiment of the invention illustrated in FIG. 3.

FIG. 4 is a functional block diagram illustrating in greater detail certain software components that operate within the application layer 266. In this embodiment, several configuration settings (settings 405) are shown within the application layer 266 for simplicity. It will be appreciated that the settings 405 may reside in multiple places, such as in the application layer 266, within the operating system 264, or in any other location. The settings 405 may be grouped or associated with one or more other components. For example, an e-mail application may have a group of configuration settings within the settings 405, and the operating system 264 may have another group of configuration settings within the settings 405. The metabase 406 contains specific information about the settings, their possible values, clues on how to display them and other relevant metadata about them. The metabase 406 may also contain role requirements and mappings for each setting.

Each of the configuration settings within the settings 405 is associated with a Configuration Service Provider (CSP) 411-413. Each CSP 411-413 is essentially a special-purpose software module that is responsible for maintaining a particular group of settings. The CSPs 411-413 are responsible for actually executing specific configuration instructions that may be included in a configuration message. In the disclosed embodiment, each configuration setting may be uniquely defined by its path through a tree. For example, consider the following sample XML statements:

```
<characteristic type="foo">
    <characteristic type="bar">
        <parm name="blah" value="5"/>
    </characteristic>
</characteristic>
```

The configuration setting identified in these sample statements is identified by it's full path: foo\bar\blah. The first part of the path for a setting (in this case "foo") identifies the CSP associated with that setting. In this way, the CSP is explicitly identified as a part of the path to the configuration setting. Of course, other schemes for identifying CSPs will become apparent to those skilled in the art.

The CSPs 411-413 are trusted components that may query, alter, or delete the settings for which they are responsible. For instance, one application, such as an e-mail application, may have a dedicated CSP (e.g., CSP 411) for maintaining settings associated with the e-mail application. The CSPs 411-413 receive instruction from an application (e.g., a "configuration manager" described below) that manages the configuration transaction and may coordinate among several CSPs. The CSP may also return an existing value for a setting if requested. Each CSP could have a hardcoded condition which must be satisfied prior to deleting the values of any protected parameter from a response document or a mirrored query document that they generate. This condition should prevent an attempt to query a password on the device.

In accordance with the invention, each CSP may internally support a transactioning capability. In other words, a CSP may include the ability to rollback a failed configuration change. A CSP indicates if it is capable of internal transactioning to the application responsible for managing the provisioning transaction. If the CSP does not support internal transactioning, it should support "external transactioning" as described below in connection with the configuration manager 401. This transactioning capability provides the system with a high degree of reliability that the provisioning transaction will not inadvertently put the mobile device 120 in an unstable state.

The configuration manager 401 is the hub of activity for the over-the-air configuration system. Essentially, it is an application registered to handle configuration messages for the mobile device 120. As mentioned above, the push router 301 passes received messages to one or more applications 266 that are registered in the Registration table to receive them. In this case, the configuration manager 401 is the application registered to handle configuration messages. Thus, when the push router 301 receives a configuration message, the push router 301 passes the message (or at least the configuration payload of the message) to the configuration manager 401.

The configuration manager 401 is programmed to parse the incoming configuration messages to identify the affected configuration settings. For example, one configuration message may contain changes to settings related to an e-mail application, while another configuration message may contain changes to settings related to the addresses of trusted proxy servers. Moreover, a single configuration message may contain changes that affect several different groups of settings. The configuration manager 401 is programmed to determine which one or more CSPs are responsible for maintaining the affected settings. In the described embodiment, that determination is made directly from information within the configuration message. More specifically, the CSP is determined based on the name of the path to the affected setting. Alternatively, the configuration message could identify only the affected settings, leaving the task of determining which CSP is responsible to the configuration manager 401.

Figure 7:
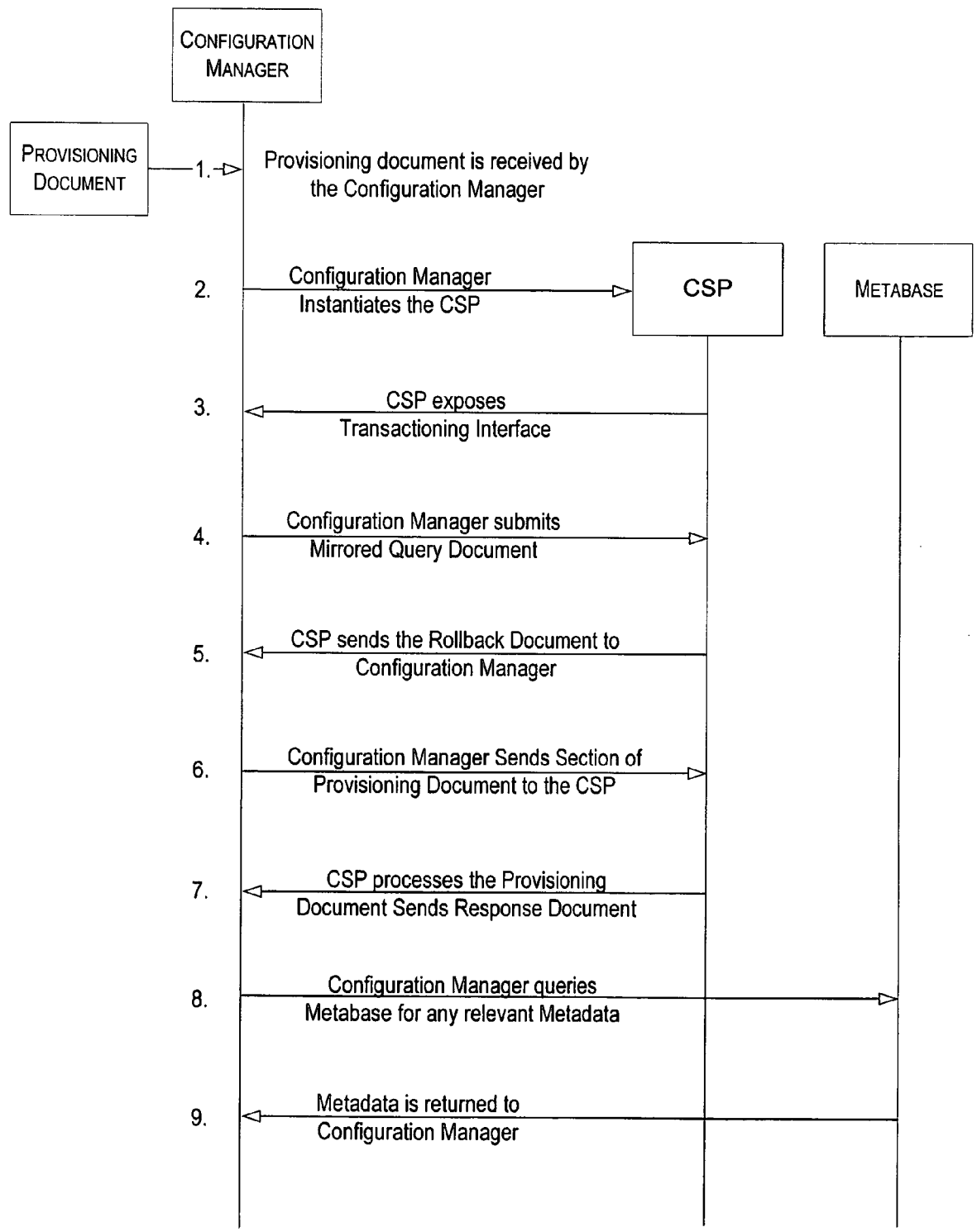
FIGS. 7 and 8 are sequence diagrams illustrating a flow of processing during a sample provisioning transaction.
Figure 8:
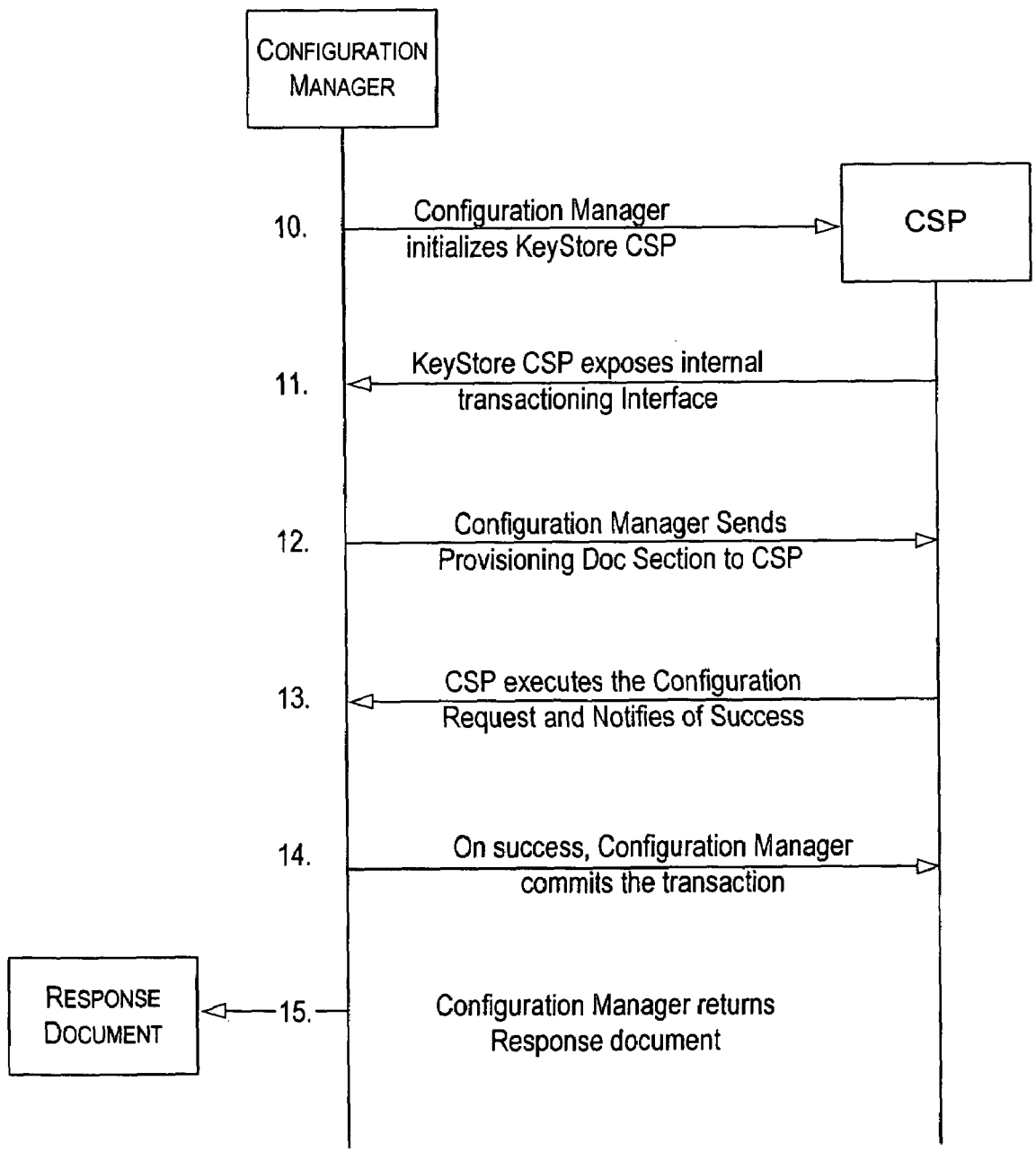

The configuration manager 401 is also configured to support "external transactioning" or the ability to rollback a provisioning transaction in case one or more CSPs either do not support internal transactioning (as described above) and there is an error in the provisioning transaction. Generally speaking, if the configuration manager 401 identifies that a particular CSP does not support internal transactioning, the configuration manager 401 first queries that CSP for the current value of any affected settings, which are returned in a mirrored or rollback document. Then the provisioning transaction is performed, and in the case of an error, the affected configuration settings are returned to their values in the mirrored or rollback document. The transactioning capabilities of the configuration system described herein is illustrated by way of example later in connection with FIGS. 7-8 and the associated text.

Sample Documents Used by the System

Figure 5:
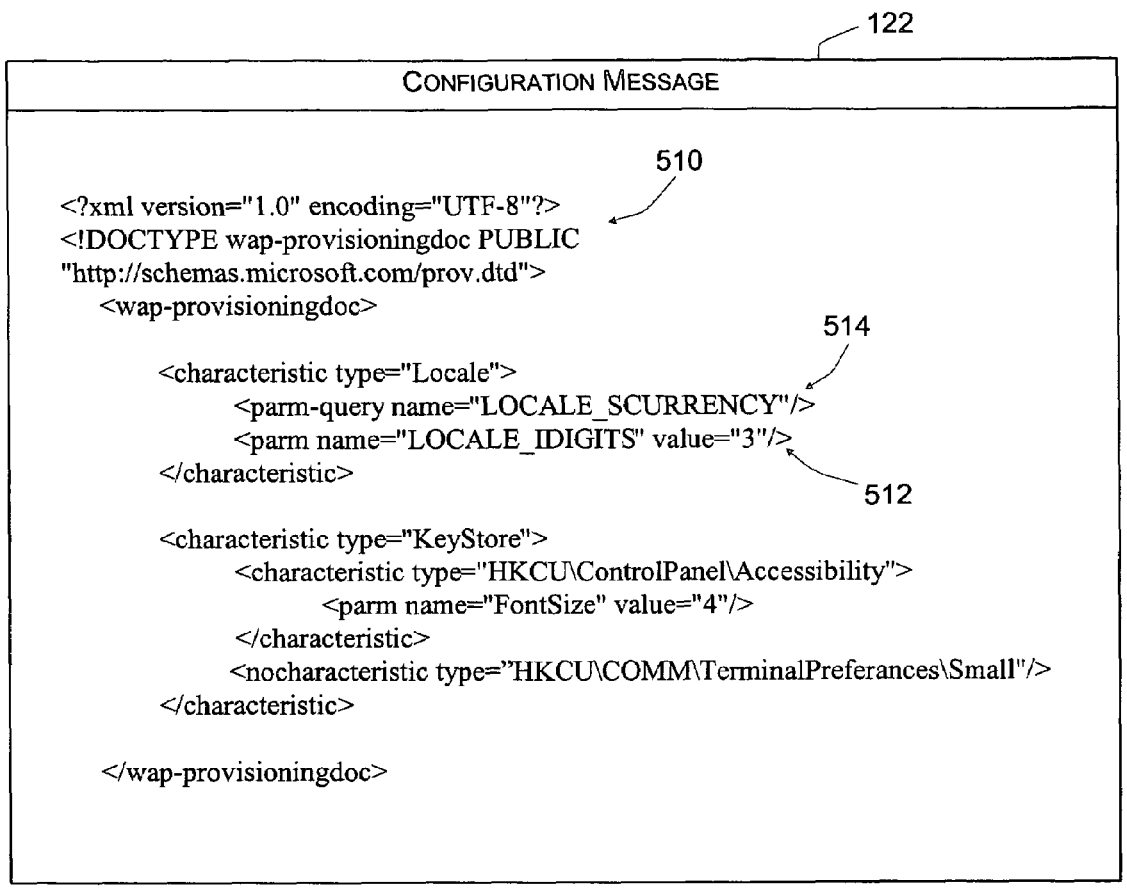
FIG. 5 is a graphical representation of information within a configuration message used by the configuration system implementing the present invention.

FIG. 5 is a graphical representation of a sample configuration message 122. As mentioned above, the typical configuration message 122 is an XML document that includes tags that define changes to or queries of settings on a mobile device. The configuration message 122 may include header information 510 that identifies a particular version of the system being used, such as a configuration management system version, and the document type of the configuration message 122. The configuration message 122 also identifies the particular configuration changes that are being made by the message. For example, the statement "parm name='LOCALE_IDIGITS' value='3'" (512) is used to set the decimal places in currency format to three. Alternatively, the statement "parm-query" (e.g, statement 514) denotes a query of a setting instead of a declaration that a setting be the provided value. When the configuration message 122 is processed, the system modifies the "parm-query" statement to recite a "parm" element having the value of the queried setting (e.g., in the form of statement 512).

In accordance with this implementation of the invention, the configuration message 122 is based on a declaratory syntax rather than an instructional syntax. In other words, rather than putting forth statements which request that an action be performed (e.g., "make setting_value=X"), the declaratory syntax allows changes to be set forth as declarations of state (e.g., "setting_value=X"). This distinction provides some unforeseen advantages over an instructional syntax, namely that the configuration message 122 essentially describes the state of the affected settings after the provisioning transaction, and may therefore be used as a response document as well. For instance, if the provisioning transaction completes without error, the configuration message may essentially be returned unchanged to indicate the success, with the exception of query statements being modified to reflect the value of the queried setting. This feature greatly simplifies the maintenance of the configuration message throughout the provisioning transaction and simplifies the creation of a response document.

Method for Provisioning Mobile Device with Transactioning

As described above, the provisioning system 100 is capable of rolling back a failed provisioning transaction through the use of either internal transactioning (supported by the CSPs) or external transactioning (supported by the configuration manager). What follows is an example of a provisioning transaction that illustrates both of those capabilities. The following example follows the sequence diagrams illustrated in FIGS. 7-8, with each identified step corresponding to an event in the sequence diagrams. At several of the steps, sample XML nomenclature is provided to illustrate what an input configuration message or a response message may look like. These samples are provided as illustrations only, and the actual implementation of the documents and messages may differ in certain aspects. The example begins with the processing illustrated in FIG. 7.

Step

Number Description

1. Provisioning document is received by the Configuration Manager. The document contains a query and sets of configuration requests for two different CSPs.

The query requests the value of the Locale parameter for Currency Symbol ($,e, etc).(LOCALE_SCURRENCY).

The change set sets the decimal places in currency format to three (LOCALE_IDIGITS); sets the font size on the device to 4 (HKCU\ControlPanel\Accessibility parm name="FontSize"); and deletes the Small font Terminal Preference Setting from the device by deleting the registry keys for that setting (using the nocharacteristic element).

```
(HKCU\COMM\TerminalPreferances\Small)
<?xml version="1.0" encoding="UTF-8"?>
<!DOCTYPE wap-provisioningdoc PUBLIC
"http://schemas.microsoft.com/prov.dtd">
    <wap-provisioningdoc>
        <characteristic type="Locale">
            <parm-query name"LOCALE_SCURRENCY"/>
            <parm name="LOCALE_IDIGITS" value="3"/>
        </characteristic>
        <characteristic type="KeyStore">
            <characteristic type="HKCU\ControlPanel\Accessibility">
                <parm name="FontSize" value="4"/>
            </characteristic>
            <nocharacteristic
            type="HKCU\COMM\TerminalPreferances\Small"/>
        </characteristic>
    </wap-provisioningdoc>
```

The Configuration Manager parses the provisioning document and splits it in two separate sections. The request is then executed serially.

2. Configuration Manager instantiates the appropriate CSP. The first characteristic element that appears in the configuration request is <characteristic type="Locale"> therefore the Locale CSP is instantiated first.

3. CSP exposes Transactioning Interface. Each CSP exposes a set of interfaces which the Configuration Manager uses when it needs to interact with the CSP. The Configuration Manager enforces the appropriate transactioning scheme based on the transactioning parameter in the interface that is exposed by the CSP.

Provisioning Transaction with External Transactioning

In the next portion of the example (steps 4-9), the Locale CSP exposes its interface and the Configuration Manager receives a "CFGTRANSACTIONING_CFGMGR" parameter, indicating that the CSP does not support internal transactioning. Thus, the Configuration Manager enforces external transactioning for that CSP. Steps 8 and 9 below describe the process used by the configuration manager to gather additional metadata for the settings affected by the change request. In this case, the CSP responds that the configuration manager needs to query the Metabase for the relevant metadata for this configuration transaction. The configuration manager successfully retrieves metadata from the Metabase in step 9 and includes it in Section 1 of a response document.

4. Configuration Manager submits Mirrored Query Document. The Config Manager generates a query for each set (e.g. parm element) contained in the provisioning document section for the Locale CSP as a first step of the External Transactioning scheme. In the current example, there is only one set that is going to change:

<parm name="LOCALE_IDIGITS" value="3"/>

This query is referred to as the Mirrored Query Document. It is submitted to the CSP.

Mirrored Query Document

```
<characteristic type="Locale">
    <parm-query name="LOCALE_IDIGITS"/>
</characteristic>
```

5. Locale CSP sends the Rollback document to Configuration Manager. The Locale CSP takes the Mirrored Query document and populates it with the requested values. It then submits this new document to the Configuration Manager as a Response document with a Rollback doc section. This information becomes Section 1 of the Rollback document. In the case of failure the Configuration Manager will use this document to restore the settings of the Locale CSP Rollback Document

```
<characteristic type="Locale">
    <parm-query name="LOCALE_IDIGITS" value="2"/>
</characteristic>
```

6. Configuration Manager Sends appropriate part of Provisioning Document to the CSP. Configuration Manager passes Input doc. Section 1. If the transaction fails it can be rolled back using the Rollback document.

Input Document Section 1

```
<wap-provisioningdoc>
    <characteristic type="Locale">
        <parm-query name="LOCALE_SCURRENCY"/>
        <parm name="LOCALE_IDIGITS" value="3"/>
    </characteristic>
<wap-provisioningdoc>
```

7. CSP processes the Provisioning Document Sends Response Document. Locale CSP processes the Provisioning Document Section 1 and sends the response document Section 1. The CSP return codes are analyzed to determine if the set has failed.

```
<characteristic type="Locale">
    <parm name="LOCALE_SCURRENCY" value="$" />
    <parm name="LOCALE_IDIGITS" value="3"/>
</characteristic>
```

8. Configuration Manager queries the Metabase for any relevant Metadata.

```
<characteristic type="Locale">
    <parm-query name="LOCALE_SCURRENCY" />
    <parm-query name="LOCALE_IDIGITS"/>
</characteristic>
```

9. Metadata is returned to Configuration Manager

```
<characteristic type=" Locale ">
    <parm name=" LOCALE_SCURRENCY " value="$"
    label="Currency
    symbol" datatype="String" options="$;#;%;X"/>
    <parm name="LOCALE_IDIGITS" value="3"
    label="Number of decimal
    places" datatype="Integer" minvalue="0" maxvalue="9"/>
</characteristic>
``` and inserted in the Response document in Section 1

Provisioning Transaction with Internal Transactioning

In the next six steps (illustrated in FIG. 8), the Configuration Manager proceeds with the provisioning transaction and exchanges data with a "KeyStore" CSP. In this part of the example, the KeyStore CSP supports internal transactioning, so no mirrored or rollback documents are passed. The KeyStore CSP may pass a "CFGTRANSACTIONING_CSPINTERNAL" message to the configuration manager to indicate that it supports internal transactioning. In this portion of the example, at step 13 the configuration manager requests the KeyStore CSP to include relevant metadata for the transaction. The CSP successfully inserts all relevant metadata in Response doc Section 2, therefore there is no need to query the Metabase.

10. Configuration Manager initializes KeyStore CSP. Since the first stage of the serial processing of the Configuration Request is completed (Input Document Section 1) the Configuration Manager proceeds with the execution of the rest of the Input document. This requires interaction with KeyStore CSP. The CSP is initialized and depending on the type of interface exposed the Configuration Manager determines which Transactioning Scheme to implement. In this case Internal Transactioning Scheme is implemented.

11. KeyStore CSP exposes internal transactioning Interface. KeyStore CSP starts BeginTransactioning on the interface exposed to the Configuration Manager as the first part of the initialization process with a CSP supporting internal transactioning.

12. Configuration Manager Sends Input Doc Section 2 to KeyStore CSP

```
<characteristic type="KeyStore">
    <characteristic type="HKCU\ControlPanel\Accessibility">
        <parm name="FontSize" value="4"/>
    </characteristic>
    <nocharacteristic type="HKCU\COMM\TerminalPreferances\Small>
</characteristic>
```

13. KeyStore CSP executes successfully the configuration request using internal transactioning and notifies Configuration Manager of success. No Mirrored Query Document or Rollback documents are generated.

The CSP appends all Metadata in the Response Document Section 2 associated with this characteristic element.

```
<characteristic type="KeyStore">
    <characteristic type="HKCU\ControlPanel\Accessibility">
        <parm name="FontSize" value="4"/>
        <parm name="FontName" value="Courier New"/>
        <parm name="FontLable" value="Device Font"/>
    </characteristic>
</characteristic>
```

14. If the KeyStore CSP returns success, Configuration Manager commits the transaction by calling the commit method on the transactioning interface and frees internal rollback document as well as the Rollback document section created in step 5.

```
ConfigTransaction : IUnknown
{
    HRESULT Commit( )
    ...
}
The CSPs are then unloaded.
```

15. Configuration Manager returns Response document Section 1 andSection 2.

```
?xml version="1.0" encoding="UTF-8"?>
<!DOCTYPE wap-provisioningdoc PUBLIC
"http://schemas.microsoft.com/prov.dtd">
    <characteristic type=" Locale ">
        <parm name=" LOCALE_SCURRENCY " value="$"
        label="Currency
        symbol" datatype="String" options="$;#;%;X"/>
        <parm name=" LOCALE_IDIGITS "value="3"
        label="Number of decimal
        places" datatype="Integer" minvalue="0" maxvalue="9"/>
    </characteristic>
    <characteristic type="KeyStore">
        <characteristic type="HKCU\ControlPanel\Accessibility">
            <parm name="FontSize" value="4"/>
            <parm name="FontName" value="Courier New"/>
            <parm name="FontLable" value="Device Font"/>
        </characteristic>
    </characteristic>
```

Thus, the forgoing example illustrates a sample provisioning transaction complete with both internal and external transactioning capabilities. It will be appreciated by those skilled in the art that the system described above is sufficient for implementing the example just provided, but that alternatives will also become apparent. For example, the configuration messages may be provided to the system through some mechanism other than the push sources and push router described above. Rather, the configuration messages may be generated locally through a configuration console or application. Alternatively, the configuration messages may be provided to the configuration manager directly over a local area network or the like without resort to a wireless connection. In addition, many of the security features described may be omitted without rendering the configuration system inoperable. For instance, one or both of the transactioning mechanisms described may be omitted, or the security roles described above may be omitted. While each of these alternatives could render the system more susceptible to security breaches or failures, the system could still function acceptably in the majority of cases.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A mobile device comprising:
    a plurality of push sources on the mobile device;
    a router component, on the mobile device, configured to receive configuration messages from the plurality of push sources, wherein the configuration messages include at least one declaration statement that declares a new setting state to be made on the mobile device;
    a configuration service provider component, on the mobile device, configured to access a setting; and
    a configuration manager component, on the mobile device, configured to receive the new setting state, identify the configuration service provider based on the new setting state, instruct the configuration service provider component to apply the new setting state and send the received configuration messages back to an initiator having the at least one declaration statement unaltered to indicate that the new setting state has been applied in association with the setting.

2. The mobile device of claim 1, wherein the router component is configured to authenticate the configuration message.

3. The mobile device of claim 1, wherein the configuration service provider component is configured to roll back a failed configuration update to a last known-good state.

4. The mobile device of claim 1, wherein the configuration service provider component is configured to provide a rollback document to the configuration manager component in response to a request, wherein the rollback document identifies a current state of settings.

5. The mobile device of claim 1, wherein the configuration manager component is configured to request from the configuration service provider component a rollback document identifying a current state of a setting and to return the setting when a provisioning transaction fails.

6. A computer-implemented method for provisioning a mobile device, the method comprising:
    providing a plurality of push sources on the mobile device, a configuration manager on the mobile device, and a configuration component on the mobile device;
    obtaining, on the configuration manager, a provisioning document from at least one of a plurality of push sources, wherein the plurality of push sources are configured to obtain the provisioning document from an external initiator, wherein the provisioning document includes at least one declaration statement that declares a value to be set on the mobile device;
    initiating, by the configuration manager, a provisioning transaction associated with the value in the provisioning document, wherein the value is associated with a setting of the mobile device;
    identifying, by the configuration manager, a configuration component responsible for maintaining the setting;
    passing the value from the configuration manager to the configuration component to determine whether to apply the value to the setting;
    instructing, by the configuration manager, the configuration component to commit the value to the setting when determination to apply the value is made; and
    sending, from the configuration manager, the received provisioning document back to an initiator having the at least one declaration statement unaltered to indicate that the new setting state has been applied in association with the setting.

7. The computer-implemented method of claim 6, wherein the external initiator includes a provisioning server in wireless communication with the mobile device.

8. The computer-implemented method of claim 6, wherein the initiator includes a provisioning server in wired communication with the mobile device.

9. The computer-implemented method of claim 6, wherein sending the response includes sending an indication that an error occurred while attempting to commit the value to the setting.

10. The computer-implemented method of claim 6, wherein passing the value to the configuration component includes identifying which configuration component is responsible for maintaining the particular setting and passing the value to the identified configuration component.

11. A computer-readable storage medium having computer-executable instructions for provisioning a mobile device, the instructions comprising:
    obtaining a provisioning document from at least one of a plurality of push sources, wherein the plurality of push sources are configured to obtain the provisioning document from an external initiator, wherein the provisioning document includes at least one declaration statement that declares a value for the mobile device;
    initiating a provisioning transaction associated with the value in the provisioning document, wherein the value is associated with a setting of the mobile device;
    identifying a configuration component responsible for maintaining the setting based on the provisioning document;
    passing the value to the configuration component to determine whether to apply the value to the setting;
    when a determination to apply the value is made, instructing the configuration component to commit the value to the setting, and sending the received provisioning document back to the external initiator with the at least one declaration statement unaltered; and
    instructing the configuration component to fail the provisioning transaction when a determination is made to not apply the value to the setting.

12. The computer-readable storage medium of claim 11, wherein the external initiator includes a provisioning server in wireless communication with the mobile device.

13. The computer-readable storage medium of claim 11, wherein the initiator includes a provisioning server in wired communication with the mobile device.

14. The computer-readable storage medium of claim 11, wherein passing the value to the configuration component includes identifying which configuration component is responsible for maintaining the particular setting and passing the value to the identified configuration component.

15. A computer-readable storage medium having computer-executable instructions for provisioning a mobile device, the instructions comprising:
    obtaining a provisioning document from at least one of a plurality of push sources, wherein the plurality of push sources are configured to obtain the provisioning document from an external initiator, wherein the provisioning document includes at least one declaration statement that declares a value for the mobile device;
    initiating a provisioning transaction associated with a value in the provisioning document, wherein the value is associated with a setting of the mobile device;

identifying a configuration component responsible for maintaining the setting based on the provisioning document;

passing the value to the configuration component to determine whether to apply the value to the setting;

when a determination to apply the value is made, instructing the configuration component to commit the value to the setting, and sending the received provisioning document back to the external initiator with the at least one declaration statement; and withholding instructing the configuration component when a determination is made to not apply the value to the setting.

16. The computer-readable storage medium of claim 15, wherein the external initiator includes a provisioning server in wireless communication with the mobile device.

17. The computer-readable storage medium of claim 15, wherein the initiator includes a provisioning server in wired communication with the mobile device.

18. The mobile device of claim 1, wherein the response indicating that the provisioning information has been applied in association with the setting includes an indication that an error occurred.

19. The mobile device of claim 1, wherein the configuration manager component is further configured to instruct the configuration service provider component to reject the provisioning information when a determination is made to not apply the provisioning information.

20. The computer-readable storage medium of claim 19, wherein the provisioning document is obtained on the mobile device, wherein the provisioning transaction is initiated on the mobile device, wherein the configuration components are identified on the mobile device, wherein passing the value to the configuration component includes identifying which configuration component is responsible for maintaining the particular setting and passing the value to the identified configuration component, and wherein the configuration component is located on the mobile device.

* * * * *